US008269665B1

(12) United States Patent
Urkowitz et al.

(10) Patent No.: US 8,269,665 B1
(45) Date of Patent: Sep. 18, 2012

(54) MONOPULSE ANGLE DETERMINATION

(75) Inventors: Harry Urkowitz, Philadelphia, PA (US);
Robert A. Postell, Philadelphia, PA (US); Robert E. Lefferts, Turnersville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 323 days.

(21) Appl. No.: 12/696,248

(22) Filed: Jan. 29, 2010

(51) Int. Cl.
*G01S 13/08* (2006.01)
*G01S 13/00* (2006.01)

(52) U.S. Cl. .......... 342/80; 342/147; 342/149; 342/159; 342/194

(58) Field of Classification Search .................... 342/80, 342/147, 149–154, 159–162, 194
See application file for complete search history.

(56) References Cited

U.S. PATENT DOCUMENTS

| | | | | |
|---|---|---|---|---|
| 4,331,958 A * | 5/1982 | Lacomme | ..................... | 342/152 |
| 4,368,468 A * | 1/1983 | Lisle et al. | ..................... | 342/151 |
| 4,486,756 A * | 12/1984 | Peregrim et al. | .............. | 342/149 |
| 4,527,161 A * | 7/1985 | Wehner | ....................... | 342/152 |
| 4,591,862 A * | 5/1986 | Parkhurst et al. | ............. | 342/427 |
| 5,059,968 A * | 10/1991 | Thompson et al. | ............ | 342/152 |
| 5,181,040 A * | 1/1993 | Inoue et al. | .................... | 342/149 |
| 5,241,317 A * | 8/1993 | Howard | ......................... | 342/149 |
| 5,334,980 A * | 8/1994 | Decker | ......................... | 342/25 C |
| 5,576,711 A * | 11/1996 | Morris et al. | .................. | 342/152 |
| RE36,819 E * | 8/2000 | Gellner et al. | .................. | 342/70 |
| 6,404,379 B1* | 6/2002 | Yu et al. | ........................... | 342/80 |
| 6,661,366 B2* | 12/2003 | Yu | .................................. | 342/17 |
| 6,697,009 B2* | 2/2004 | Yu | .................................. | 342/17 |
| 7,136,014 B2* | 11/2006 | McCord et al. | ............... | 342/149 |
| 7,250,902 B2* | 7/2007 | Manoogian et al. | .......... | 342/154 |
| 7,417,584 B1* | 8/2008 | Reifler et al. | ................. | 342/148 |
| 7,671,789 B1* | 3/2010 | Yu | ................................. | 342/152 |
| 7,859,451 B2* | 12/2010 | Yu et al. | ........................ | 342/149 |
| 2003/0085833 A1* | 5/2003 | Yu | ................................... | 342/17 |
| 2006/0109172 A1* | 5/2006 | McCord et al. | ............... | 342/149 |

* cited by examiner

*Primary Examiner* — Jack W Keith
*Assistant Examiner* — Peter Bythrow
(74) *Attorney, Agent, or Firm* — Howard IP Law Group, P.C.

(57) ABSTRACT

Modern tactical radars frequently use phase shifters to electronically specify or steer the spatial position of the antenna beam without requiring mechanical motion of the antenna. These phase shifters can only be set correctly for a specific frequency. If a waveform is transmitted through the antenna which consists of multiple segments which differ in frequency or modulation from that frequency used to steer the position of the beam, errors are introduced into the monopulse measurement. These monopulse errors are reduced or eliminated by correction factors. The monopulse errors are corrected by pre-computed factors or terms which result from the differences in frequency and modulation used in the waveform from the frequency used to steer or position the beam. Correction is also provided for radar altitude. These correction factors are easily pre-computed and applied only when needed to minimize the computational requirements.

20 Claims, 5 Drawing Sheets

MONOPULSE ANGLE DETERMINATION

This invention was made with Government Support under Contract No. N00024-03-C-6110 awarded by the Department of the Navy. The Government has certain rights in this invention.

BACKGROUND

The present disclosure relates to radar monopulse signal processing. A monopulse signal processing system or arrangement determines the angle between the radar receive beam axis of a radio-frequency (RF) antenna and a line extending to the apparent source of a received RF signal. The received RF signal may originate as a "skin" or surface reflection of electromagnetic energy impinging on a radar "target", or it may originate from a transmitter of a signal from the target itself, as might be the case with an identification transponder. Thus, both active and passive sources are included in the generic term "source."

In the past, the term "radio frequencies" was interpreted to mean a limited range of frequencies, such as, for example, the range extending from about 20 KHz to 2 MHz. Those skilled in the art know that "radio" frequencies as now understood extends over the entire frequency spectrum, including those frequencies in the "microwave" and "millimeter-wave" regions, and up to, and including, light-wave frequencies. Many of these frequencies are very important for commercial purposes, as they include the frequencies at which radar systems, global positioning systems, satellite cellular communications and ordinary terrestrial cellphone systems operate.

Many modern tactical radars use phase shifters to electronically specify the spatial position of the antenna beam without requiring mechanical motion of the antenna. These phase shifters can only be set correctly for a specified frequency. If a waveform is transmitted through the antenna which differs in frequency from that used to steer the position of the beam, an error will be introduced into the monopulse measurements. A monopulse waveform may consist of many subpulses or segments, each of which can provide information about the location of the target. Each segment may have different modulation and different frequencies, which introduce monopulse errors. By proper application of correction factors these errors can be mitigated.

FIG. 1A is a highly simplified representation of a monopulse radar system 8. System 8 of FIG. 1A includes a monopulse transmitting and receiving antenna 10 which has a center 11, an antenna plane 10*p*, an antenna "broadside" axis which lies along a line 12 perpendicular to antenna plane 10*p*, and a beam axis which can be steered away from broadside to lie along an another direction line 13. In many reflector antenna systems, the lines 12 and 13 always coincide. In many phased array antennas the lines 12 and 13 coincide only for one beam pointing angle and diverge for all others. A signal source 14, which may result from reflection, lies on a line 16 extending from the antenna center 11. In order to assign directions from the location from which the signal source 14 propagates, it is necessary to assign coordinate axes for the antenna 10. In FIG. 1A, coordinate axis Y 12, is the line extending from the center 11 perpendicular to the plane 10*p* of the array 10. Two axes X and Z that are perpendicular to axis Y and to each other are defined in the antenna plane 10*p*. These axes are labeled X and Z. By convention, the positive X axis is defined to the right looking outward from the antenna 10. The positive Z direction is defined in the upward direction.

Spatial directions can be measured by direction angles. The direction angle $\alpha_0$ in FIG. 1A is measured from the positive X axis to the commanded beam direction line 13. The direction angle $\beta_0$ measured from the positive Z axis to the beam direction line 13. The direction angles to the target 14 may be measured as departures from the direction angles $\alpha_0$ and $\beta_0$ by the angular differences $\delta\alpha$ and $\delta\beta$, respectively. That is, if the target direction lies along the line 16, the departures from the beam direction line or axis 13 are labeled or designated $\delta\alpha$ and $\delta\beta$. More commonly, angular departures are measured as differences in direction cosines. In the alpha a coordinate, the departure in the $\alpha$ angle cosine is denoted by $$\Delta u = \cos\alpha - \cos\alpha_0$$

The departure in the beta angle cosine is denoted by $$\Delta v = \cos\beta - \cos\beta_0$$

As viewed from the center 11 of antenna 10, the target 14 is displaced from the beam axis 13 by $\delta\alpha$ from the $\alpha_0$ direction and by $\delta\beta$ from the $\beta_0$ direction. The angular cosine departures $\Delta u$ and $\Delta v$ are determined in a monopulse system by monopulse signal processing performed upon the total antenna received signal, in complex envelope form comprised of three complex signals: $\Delta\alpha$, $\Delta\beta$, $\Sigma$. Signal $\Delta\alpha$ is obtained as the difference of the two vertical halves of the antenna received output. Signal $\Delta\beta$ is obtained as the difference of the two horizontal halves of the antenna received output. The $\Sigma$ signal is the entire received output of the antenna. These three signals are conceptually separated from each other by circuits associated with the antenna, which separating circuits are illustrated as a block 6. The three signals separated by block 6 are coupled to a monopulse signal processing system included in a receiver processing (PROC) portion 20*a* of radar 8. The processing is performed on the complex envelopes. Given the antenna signals $\Sigma$, the total antenna output;

$\Delta\alpha$, the difference of the half-antenna outputs corresponding to the $\alpha$ direction; and $\Delta\beta$, the difference of the half-antenna outputs corresponding to the $\beta$ direction, the $\alpha$ monopulse ratio $\rho_\alpha$, and the $\beta$ monopulse ratio $\rho_\beta$ are formed as follows $$\rho_\alpha = \operatorname{Re}\left(\frac{\Delta\alpha}{\Sigma}\right)$$

$$\rho_\beta = \operatorname{Re}\left(\frac{\Delta\beta}{\Sigma}\right)$$

From these quantities, the increments in the direction cosines are obtained. These are, as indicated earlier $$\Delta u = \cos\alpha - \cos\alpha_0$$

$$\Delta v = \cos\beta - \cos\beta_0$$

where, as indicated above, $\alpha_0$ and $\beta_0$ are the commanded "steering" angles, and $\cos\alpha_0$ and $\cos\beta_0$ are the corresponding angle cosines. Then $\Delta u$ and $\Delta v$ are obtained by insertion of $\rho_\alpha$ and $\rho_\beta$ into odd degree polynomials $$P_\alpha(\rho_\alpha)$$

and $$P_\beta(\rho_\beta)$$

These polynomials are obtained in known fashion by antenna calibration.

Also in the arrangement of FIG. 1A, a transmitter Tx illustrated as a portion 20*b* interacts with the remainder of system 8 to transmit a coded signal including a plurality of subpulses. Transmitter portion 20*b* may use the antenna 10 for transmission, or it may use some other antenna, as known in the art. In general, the number of subpulses to be transmitted in each pulse can be selected arbitrarily. The transmitted pulse is divided into a number of subpulses. Each subpulse, when properly isolated from the other subpulses and separately filtered, is selected to have the necessary bandwidth and transmitted power to satisfy the system bandwidth required for a specific or selected range resolution and sufficient power to satisfy the desired target detection range. The number of subpulses is limited, in general, by the beam-steering capability in terms of the number of beam positions that can be achieved within the constraints of the available equipment. In a particular embodiment of the disclosure described herein, the number of subpulses per pulse is selected to be four as illustrated in FIG. 1B. More or fewer subpulses per pulse may be appropriate for systems with lesser or greater constraints. The purpose of the use of plural subpulses per pulse is to obtain several or plural values of $\Delta u$ and $\Delta v$, which can be averaged in order to mitigate or ameliorate perturbations occasioned by factors including noise. The transmitter portion 20b of FIG. 1A also includes a beam steering controller BSC that provides the angle steering command to the antenna 10. The beam steering controller and the waveform generator are illustrated as blocks 48 and 52, respectively, in FIG. 2.

For purposes of explanation, four subpulses are assumed. FIG. 1B is an amplitude-time plot 21 illustrating a time-sequential set of four subpulses designated 1, 2, 3, and 4. The subpulses differ from each other in frequency. More particularly, subpulse 1 may be at a frequency of $f_{BAND}$–A MHz, subpulse 2 may be at a frequency of $f_{BAND}$–B MHz, subpulse 3 may be at a frequency of $f_{BAND}$+C MHz, and subpulse 4 may be at a frequency of $f_{BAND}$+D MHz, where frequencies A, B, C, and D are different offset frequencies, much smaller or less than the electromagnetic carrier frequency used for steering. The frequency $f_{BAND}$ may have a multiplicity of values. A monopulse system may also operate in a passive mode in which the radar antenna acts only in a receive mode. In this passive mode, the radar acts as a passive receiver of transmissions from the target acting as source transponder, where the angle of arrival coordinates are determined by the radar in its receive mode. In such a passive or receive-only radar mode, the arriving electromagnetic wave will have a signal structure as a function of frequency $f_{Band}$–A MHz, where the value of $f_{BAND}$ is preselected by auxiliary communications with the radiating source. The signals structure in the passive radar mode is illustrated in FIG. 1C.

FIG. 2 is a simplified block diagram illustrating details of receiving and monopulse processing system 20a of FIG. 1A. A signal processor in accordance with this disclosure may operate in either an analog or digital manner, in accordance with its construction. However, a digital processor is preferred.

The monopulse processing system 20a of FIG. 2 includes a receiver and a matched filter system, illustrated as a block 22, for proper filtering of the received signal. The output from the receiver and matched filter system 22 is generated on a set of paths designated together as 24, and may be viewed as including three complex envelope signals, namely $\Delta\alpha$, $\Delta\beta$, and $\Sigma$. These three complex envelope signals are the outputs from system 22 and are coupled by paths 24 to a bank or set 32 of three complex analog-to-digital converters (ADCs) $32_1$, $32_2$, $32_3$. In response to timing signals from a controller or radar control computer 90, the bank 32 of complex A-to-D converters simultaneously converts the complex envelopes of each of the three signals $\Delta\alpha$, $\Delta\beta$, and $\Sigma$ from the matched filter system 22 into three separate complex binary (digital) values. In a typical system, the bank of A-to-D converters 32 may provide each complex envelope component in the form of the components (real and imaginary) of the complex envelope, and any number of bits may be used. Each time the controller 90 activates the bank 32 of A-to-D converters, each of these converters provides a new complex value at its output and on a signal path 28. More particularly, the digitized output from ADC $32_1$ is applied to a path $28_1$, the digitized output from ADC $32_2$ is applied to a path $28_2$, and the digitized output from ADC $32_3$ is applied to a path $28_3$. As a group, these A-to-D converters together provide a new set of these three complex envelope values each time a conversion is commanded. If digital beam forming is employed in a phased array antenna, then the digital beam former provides the same three complex outputs from the ADCs 32. The complex envelope values from ADC $32_2$, representing the "sum" or $\Sigma$ signal, are provided to a target detection processor 34 for use in determining whether a target is present in the portion of the return signal to which these digital values correspond. The complex digital values of the three outputs of the analog to digital converters ADC $32_1$, $32_2$, $32_3$ are provided to a monopulse signal processing computer designated generally as 40, which is illustrated as including a "prior art" portion 40a joined by a path 41 to a portion 40b according to an aspect of the disclosure, which together provide as outputs values of $\Delta u_{TAR}=\Delta\cos\alpha$ and $\Delta v_{TAR}=\Delta\cos\beta$, which are the corrected angle cosines between the line 16 extending to the target 14 and the antenna beam axis 13 of FIG. 1 in the alpha and $\beta$ directions, respectively. The direction angles $\alpha$ and $\beta$ may be termed "traverse" and "co-elevation" angles (sometimes known as azimuth and elevation), respectively. The corrected values of u and v, the direction cosines, are applied to tracker 95 as $\Delta u_{TAR}$ and $\Delta v_{TAR}$.

Target detection processor 34 of FIG. 2 determines whether the received signal values indicate the presence of a target. If they do, then the detection processor 34 provides to tracker 95 a detected-target signal which specifies the position of the target. If they do not indicate the presence of a target, then either no signal or a no-target signal is provided to tracker 95 by detection processor 34. The monopulse processor provides angular cosine coordinates to target tracker 95, which tracks the locations of the various targets in known manner with the aid of signals from target detection processor 34 and control signals from controller 90.

The monopulse signal processing computer 40 of FIG. 2 ultimately provides to tracker 95 a set of target angle coordinates, in the form of angle cosines $\Delta u_{TAR}$ and $\Delta v_{TAR}$, for each set of received input values. These target angle signals specify the angle between the beam axis and the target in the event that the processed values include target energy. If tracker 95 receives a detected-target signal in conjunction with a set of the target angle signals, then tracker 95 determines the target position from the known beam position in combination with the determined range and direction cosines of the target. Tracker 95 then determines whether this target location is a newly detected target or is the new position of an old or previously identified target. If it is a new target, the tracker establishes a new target track to begin following this target. If it is a new position of an old target, then this new position is used to update the track on that old target by providing this new position as the most recent target location. When no detected-target signal or a no-target signal is received in conjunction with a set of target angle cosine signals, tracker 95 discards those angle cosine signals without further processing. Both the target detection processor 34 and the tracker 95 are conventional, aspects of the present disclosure being concerned with the monopulse signal processing 40 which converts the received digital values to their corresponding monopulse ratios and then to target angles cosines.

Significant discrepancies or errors have been found when comparing the target angle as determined by skin reflections with those determined by an active source on the target, such as a transponder. Improved or alternative monopulse processing is desired.

SUMMARY

Modern tactical radars frequently use phase shifters to electronically specify or steer the spatial position of the antenna beam without requiring mechanical motion of the antenna. These phase shifters can only be set correctly for a specific frequency. If a waveform is transmitted through the antenna which consists of multiple segments which differ in frequency or modulation from that frequency used to steer the position of the beam, errors are introduced into the monopulse measurement. These monopulse errors are reduced or eliminated by correction factors. The monopulse errors are corrected by pre-computed factors or terms which result from the differences in frequency and modulation used in the waveform from the frequency used to steer or position the beam. Correction is also provided for radar altitude. These correction factors are easily pre-computed and applied only when needed to minimize the computational requirements.

A radar system according to an aspect of the disclosure includes an antenna and an antenna beam direction controller, and also includes a transmitter for transmitting subpulses at nominal frequencies F but with modulation which may result in an actual average frequency different from frequencies F. A receiver receives monopulse signals from a target, and generates rho signals, each of which rho signals is the real component of one of eight complex monopulse ratios, four of which represent the $\Delta\alpha$ angle and the other four of which represent the $\Delta\beta$ angle. A polynomial processor is coupled to the receiver, for producing uncorrected cosine differences of angular offsets of the target from the commanded beam pointing direction $$\cos(\Delta_0+\delta\alpha)-\cos\alpha_0$$

$$\cos(\beta_0+\delta\beta)-\cos\beta_0;$$

The radar system also includes a multiplicative correction processor for multiplying the uncorrected cosine differences by a factor including (a) the frequency (F) at which the polynomial is determined and (b) the actual average frequency ($f_{act}$) of the particular subpulse, to thereby generate multiplied cosine differences for each subpulse. A summing correction processor is coupled to the multiplicative correction processor for adding to the multiplied cosine differences a correction term for compensating for apparent movement of the target arising in a particular direction from beam movement at each subpulse, to thereby generate a plurality of multiplicatively and additively compensated angles or angle cosine difference signals representing the direction of the target. An averaging arrangement is coupled to the summing correction processor for averaging the angles or angle cosine difference signals over all subpulses of a pulse to thereby produce averaged corrected angular difference signals representative of the location of the target. In a particular embodiment of this aspect of the disclosure, the summing correction processor further adds to the multiplied cosine differences a correction term for compensating for the actual speed of light in the environment of the radar. The correction term for compensating for apparent movement is in the form of one of $$\left(\frac{f_{BAND}c}{f_{act}c_0}-1\right)u \text{ and } \left(\frac{f_{BAND}c}{f_{act}c_0}-1\right)v.$$

In a version of this embodiment, a squint corrector is coupled to the averaging arrangement, for summing a squint correction with the averaged angular difference signals to generate target angular information representative of corrected direction of the target.

A radar system according to another aspect of the disclosure includes a transmitter, a waveform generator coupled to the transmitter for driving the transmitter with sets of sequential pulses. Each pulse of each of the sets is jump-frequency modulated relative to other pulses of the set, to thereby define a plurality of subpulses for each of the sets of sequential pulses. The radar system comprises an antenna coupled to the transmitter, for transmitting electromagnetic signals in response to the sets of sequential subpulses, and for, in the presence of a target, generating separate return signals for each of the sequential subpulses of each set. A receiver receives the return signals and generates received signals. The received signals include a separate digital signal subpulse for each of the separate return signals. A splitting arrangement is coupled to at least one of the antenna and the receiver for splitting the received signals into co-elevation and traverse difference components and a sum component. A monopulse ratio processor is coupled to the splitting arrangement for combining the co-elevation and traverse difference components and the sum component signal to provide a monopulse ratio. A monopulse correction processor is coupled to the monopulse ratio processor for correcting the direction of the target with corrections based on at least one subpulse frequency and one of active and passive operating modes.

A radar system according to an aspect of the disclosure includes a transmitter and a waveform generator coupled to the transmitter for driving the transmitter with sets of sequential pulses. Each pulse of each of the sets is jump-frequency modulated relative to other pulses of the set. The radar system comprises an antenna coupled to the transmitter, for transmitting electromagnetic signals in response to the sets of sequential pulses, and a receiver for, in the presence of a target, generating separate return signals for each of the sequential pulses of each set. The receiver receives the return signals and generates received signals, which include a separate digital signal for each of the separate return signals. A splitting arrangement is coupled to the receiver for splitting the received signals into vertical and horizontal difference components and a sum component; and a monopulse processor coupled to the splitting arrangement for combining the vertical and horizontal difference components and a sum component signal to provide a monopulse ratio; and a monopulse ratio processor coupled to the monopulse processor for generating corrected direction of the target cos $\alpha_{target}$ by $$\cos\alpha_{target} = \cos\alpha_{des} + \frac{1}{n_{sp}}\sum_{i=1}^{n_{sp}}\left[\frac{F_1 P_\alpha(\rho_{ai})}{f_{acti}} + \left(\frac{cf_{BAND}}{c_0 f_{acti}}-1\right)\cos\alpha_{des}\right] + \Delta u_{sq} \quad (1)$$

where:
  cos $\alpha_{des}$=designated cos $\alpha$ from the beam steering controller (BSC);
  $n_{sp}$=number of subpulses;
  $F_1$=nominal frequency for which the $\alpha$ polynomial $P_\alpha(\rho)$ was obtained;
  $f_{BAND}$=the nominal frequency of the frequency band in use;
  $f_{acti}$=actual frequency of the i-th subpulse=$f_{BAND}$+subpulse average frequency;
  $\rho_{ai}$=real part of i-th monopulse ratio for subpulse i;

$P_\beta(\rho)$=alpha polynomial for the $\alpha$ angle derived for frequency $F_1$, and evaluated at real part $\rho$ of the monopulse ratio;

c=light speed at the antenna;

$c_0$=vacuum light speed;

$\Delta u_{sq}$=squint correction for cos $\alpha$, as shown in FIG. 4A, and obtained in an antenna calibration facility, and for generating corrected direction of target cos $\beta_{target}$ by $$\cos\beta_{target} = \qquad(2)$$
$$\cos\beta_{des} + \frac{1}{n_{sp}}\sum_{i=1}^{n_{sp}}\left[\frac{F_1 P_\beta(\rho_{\beta i})}{f_{acti}} + \left(\frac{cf_{BAND}}{c_0 f_{acti}} - 1\right)\cos\beta_{des}\right] + \Delta v_{sq}$$

where:

cos $\beta_{des}$=designated cos $\beta$ from the beam steering controller (BSC) indicated in FIG. 2;

$n_{sp}$=number of subpulses;

$F_1$=nominal frequency for which the $\beta$ polynomial $P_\beta(\rho)$ was obtained;

$f_{BAND}$=the nominal frequency of the frequency band in use;

$f_{acti}$=actual frequency of the i-th subpulse=$f_{Band}$+subpulse average frequency;

$\rho_{\beta i}$=real part of i-th monopulse ratio for subpulse i;

$P_\beta(\rho)$=beta polynomial for the $\beta$ angle derived for frequency $F_1$, and evaluated at real part $\rho$ of the monopulse ratio;

c=light speed at the antenna;

$c_0$=vacuum light speed;

$\Delta v_{sq}$=squint correction for cos $\beta$, and obtained in an antenna calibration facility.

DETAILED DESCRIPTION

Figure 2:
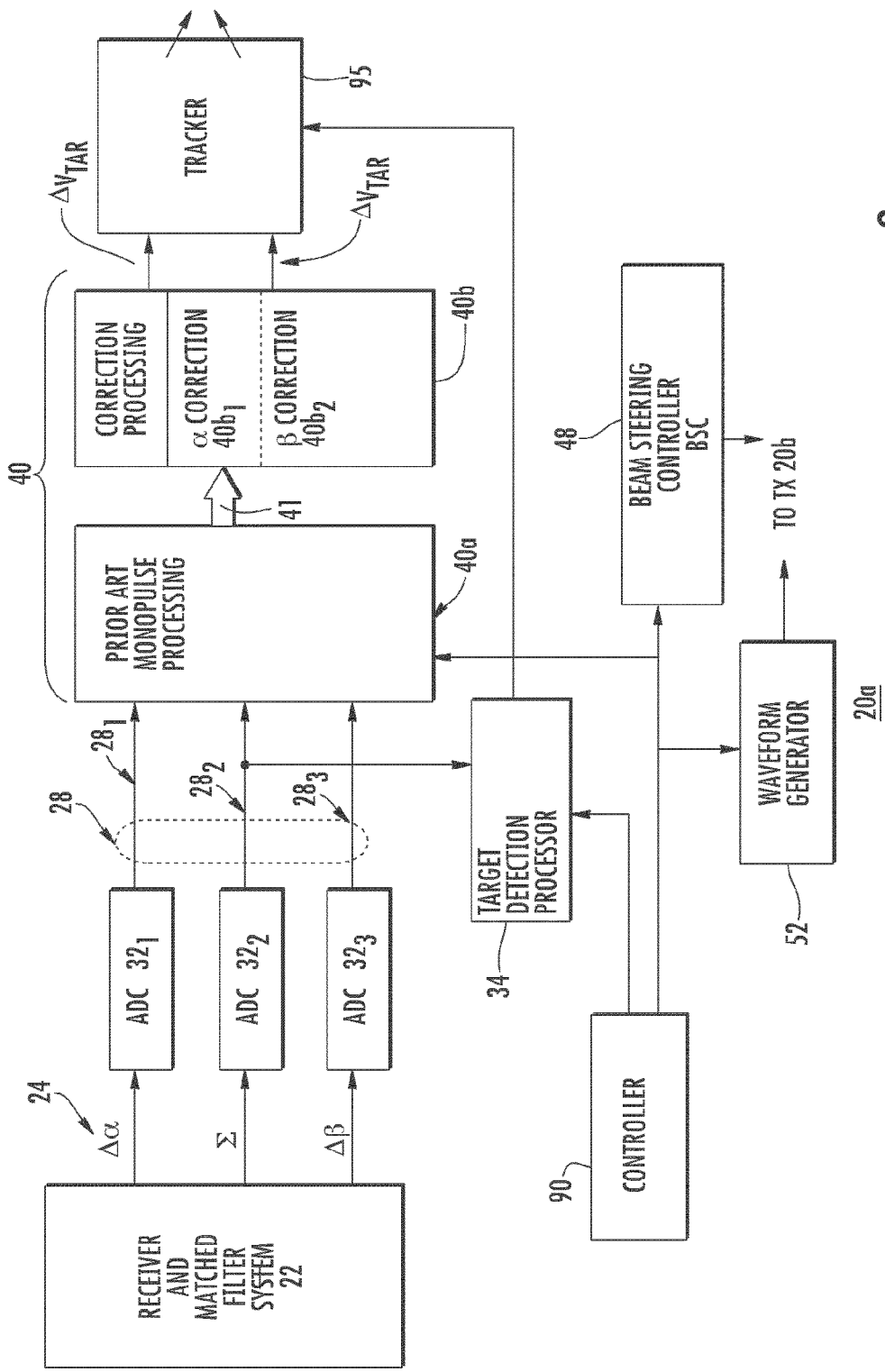
FIG. 2 is a simplified block diagram of a monopulse signal processing system of FIG. 1 which includes both prior-art monopulse signal processing and processing according to aspects of the disclosure.
Figure 3:
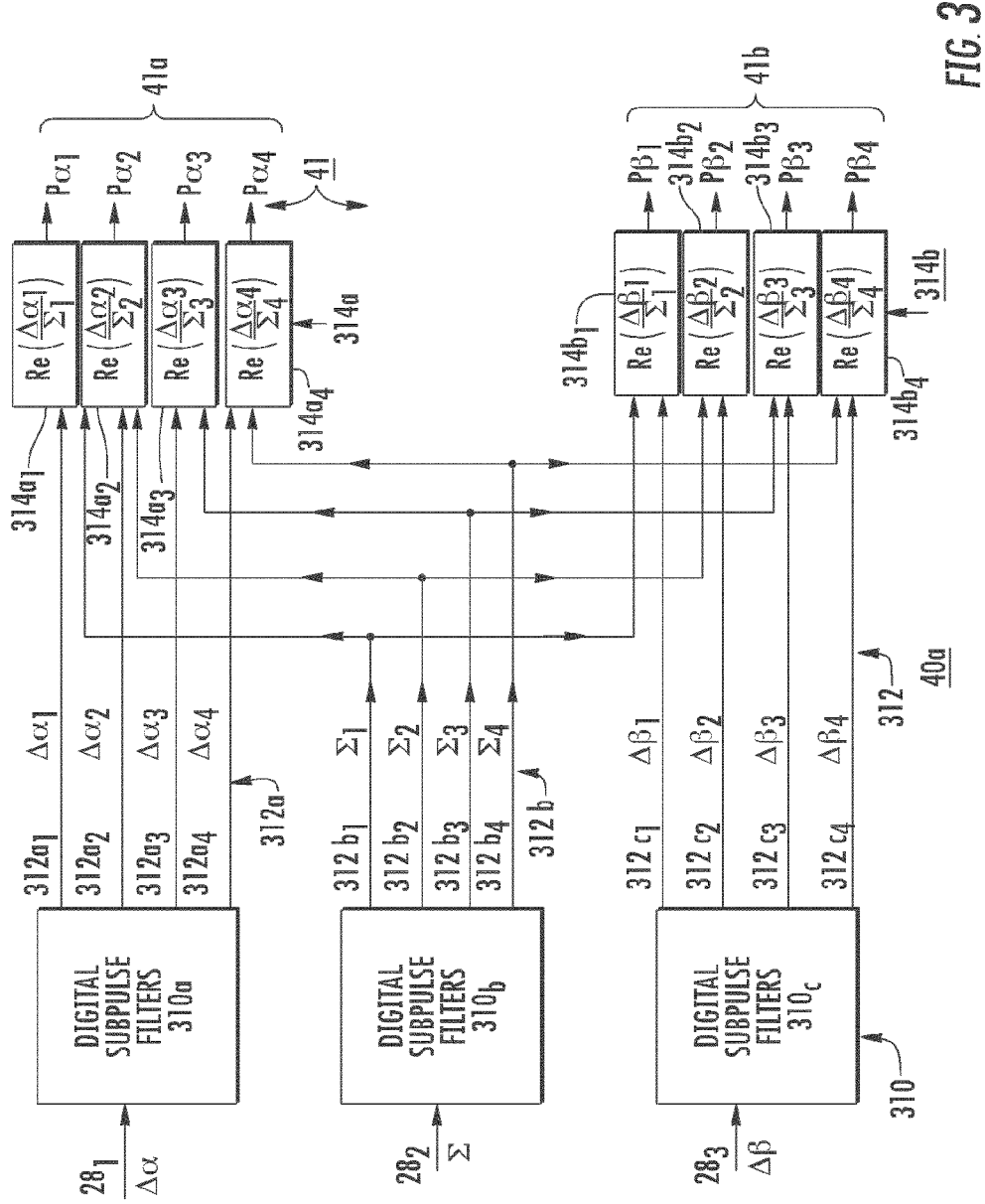
FIG. 3 is a simplified block diagram illustrating the prior-art monopulse signal processing of FIG. 2, and in particular the processing of the complex envelopes of the traverse and co-elevation signals.

FIG. 3 represents a simplified block diagram illustrating some prior art processing of monopulse processor 40a of FIG. 2, for generating a plurality of 2N pairs of rho ($\rho$) signals, where N=4. Each $\rho$ is the real component of one ratio out of four pairs of complex monopulse ratios (alternatively, each p may be the imaginary component). Four of these represent the $\Delta\alpha$ angle and the other four represent the $\Delta\beta$ angle. Thus, each rho is the real component of one of the eight complex monopulse ratios. As mentioned, the number of subpulses may be selected at will. In FIG. 3, the complex digitized receiver outputs are applied to monopulse processor 40a over a set 28 of complex buses or paths. More particularly, the complex $\Delta\alpha$ and $\Delta\beta$ signals are applied over paths $28_1$ and $28_3$, respectively, to digital subpulse filters $310_a$ and $310_c$, respectively. The complex $\Sigma$ signal is applied by way of path $28_2$ to digital subpulse filter $310_b$. Each output of subpulse filters $310_a$ and $310_c$ is coupled with the corresponding output of digital subpulse filter $310_b$ in a rho block of a set 314 of rho blocks, to produce the real part of the corresponding ratio $\rho_\alpha$. This results, at the outputs of the rho blocks of set 314, in the quantities $$\rho_{\alpha_1} = \text{Re}\left(\frac{\Delta\alpha_1}{\Sigma_1}\right)$$

$$\rho_{\alpha_2} = \text{Re}\left(\frac{\Delta\alpha_2}{\Sigma_2}\right)$$

$$\rho_{\alpha_3} = \text{Re}\left(\frac{\Delta\alpha_3}{\Sigma_3}\right)$$

$$\rho_{\alpha_4} = \text{Re}\left(\frac{\Delta\alpha_4}{\Sigma_4}\right)$$

$$\rho_{\beta_1} = \text{Re}\left(\frac{\Delta\beta_1}{\Sigma_1}\right)$$

$$\rho_{\beta_2} = \text{Re}\left(\frac{\Delta\beta_2}{\Sigma_2}\right)$$

$$\rho_{\beta_3} = \text{Re}\left(\frac{\Delta\beta_3}{\Sigma_3}\right)$$

$$\rho_{\beta_4} = \text{Re}\left(\frac{\Delta\beta_4}{\Sigma_4}\right)$$

More particularly, the $\Delta\alpha_1$ output on path $312a_1$ of subpulse filter $310_a$ is coupled with the $\Sigma_1$ output on path $312b_1$ of subpulse filter $310b$ in a rho block $314a_1$ to produce $$\rho_{\alpha_1} = \text{Re}\left(\frac{\Delta\alpha_1}{\Sigma_1}\right)$$

The other $\rho$'s are formed in a similar way. Thus, the $\Delta\alpha_2$ output on path $312a_2$ of subpulse filter $310_a$ is coupled with the $\Sigma_2$ output on path $312b_2$ of subpulse filter $310b$ in a rho block $314a_2$ to produce $$\rho_{\alpha_2} = \text{Re}\left(\frac{\Delta\alpha_2}{\Sigma_2}\right).$$

Similarly, the $\Delta\alpha_3$ output on path $312a_3$ of subpulse filter $310_a$ is coupled with the $\Sigma_3$ output on path $312b_3$ of subpulse filter $310b$ in a rho block $314a_3$ to produce $$\rho_{\alpha_3} = \text{Re}\left(\frac{\Delta\alpha_3}{\Sigma_3}\right),$$

and the $\Delta\alpha_4$ output on path $312a_4$ of subpulse filter $310_a$ is coupled with the $\Sigma_4$ output on path $312b_4$ of subpulse filter $310b$ in a rho block $314a_4$ to produce $$\rho_{\alpha_4} = \text{Re}\left(\frac{\Delta\alpha_4}{\Sigma_4}\right).$$

Also, the $\Delta\beta_1$ output on path $312c_1$ of subpulse filter $310_c$ is coupled with the $\Sigma_1$ output on path $312b_1$ of subpulse filter $310b$ in a rho block $314b_1$ to produce $$\rho_{\beta_1} = \text{Re}\left(\frac{\Delta\beta_1}{\Sigma_1}\right),$$

the $\Delta\beta_2$ output on path $312c_2$ of subpulse filter $310_c$ is coupled with the $\Sigma_2$ output on path $312b_2$ of subpulse filter $310b$ in a rho block $314b_2$ to produce $$\rho_{\beta_2} = \text{Re}\left(\frac{\Delta\beta_2}{\Sigma_2}\right),$$

the $\Delta\beta_3$ output on path $312c_3$ of subpulse filter $310_c$ is coupled with the $\Sigma_3$ output on path $312b_3$ of subpulse filter $310b$ in a rho block $314b_3$ to produce $$\rho_{\beta_3} = \text{Re}\left(\frac{\Delta\beta_3}{\Sigma_3}\right),$$

and the $\Delta\beta_4$ output on path $312c_4$ of subpulse filter 310, is coupled with the $\Sigma_4$ output on path $312b_4$ of subpulse filter $310b$ in a rho block $314b_4$ to produce $$\rho_{\beta_4} = \text{Re}\left(\frac{\Delta\beta_4}{\Sigma_4}\right).$$

Put another way, $\Delta\alpha_1$ of $312a_1$ is coupled with $\Sigma_1$ of $312b_1$ to produce $$\rho_{\alpha_1} = \text{Re}\left(\frac{\Delta\alpha_1}{\Sigma_1}\right),$$

$\Delta\alpha_2$ of $312a_2$ is coupled with $\Sigma_2$ of $312b_2$ to produce $$\rho_{\alpha_2} = \text{Re}\left(\frac{\Delta\alpha_2}{\Sigma_2}\right),$$

$\Delta\alpha_3$ of $312a_3$ is coupled with $\Sigma_3$ of $312b_3$ to produce $$\rho_{\alpha_3} = \text{Re}\left(\frac{\Delta\alpha_3}{\Sigma_3}\right),$$

$\Delta\alpha_4$ of $312a_4$ is coupled with $\Sigma_4$ of $312b_4$ to produce $$\rho_{\alpha_4} = \text{Re}\left(\frac{\Delta\alpha_4}{\Sigma_4}\right),$$

$\Delta\beta_1$ of $312c_1$ is coupled with $\Sigma_1$ of $312b_1$ to produce $$\rho_{\beta_1} = \text{Re}\left(\frac{\Delta\beta_1}{\Sigma_1}\right),$$

$\Delta\beta_2$ of $312c_2$ is coupled with $\Sigma_2$ of $312b_2$ to produce $$\rho_{\beta_2} = \text{Re}\left(\frac{\Delta\beta_2}{\Sigma_2}\right),$$

$\Delta\beta_3$ of $312c_3$ is coupled with $\Sigma_3$ of $312b_3$ to produce $$\rho_{\beta_3} = \text{Re}\left(\frac{\Delta\beta_3}{\Sigma_3}\right),$$

and $\Delta\beta_4$ of $312c_4$ is coupled with $\Sigma_4$ of $312b_4$ to produce $$\rho_{\beta_4} = \text{Re}\left(\frac{\Delta\beta_4}{\Sigma_4}\right),$$

Figure 4A:
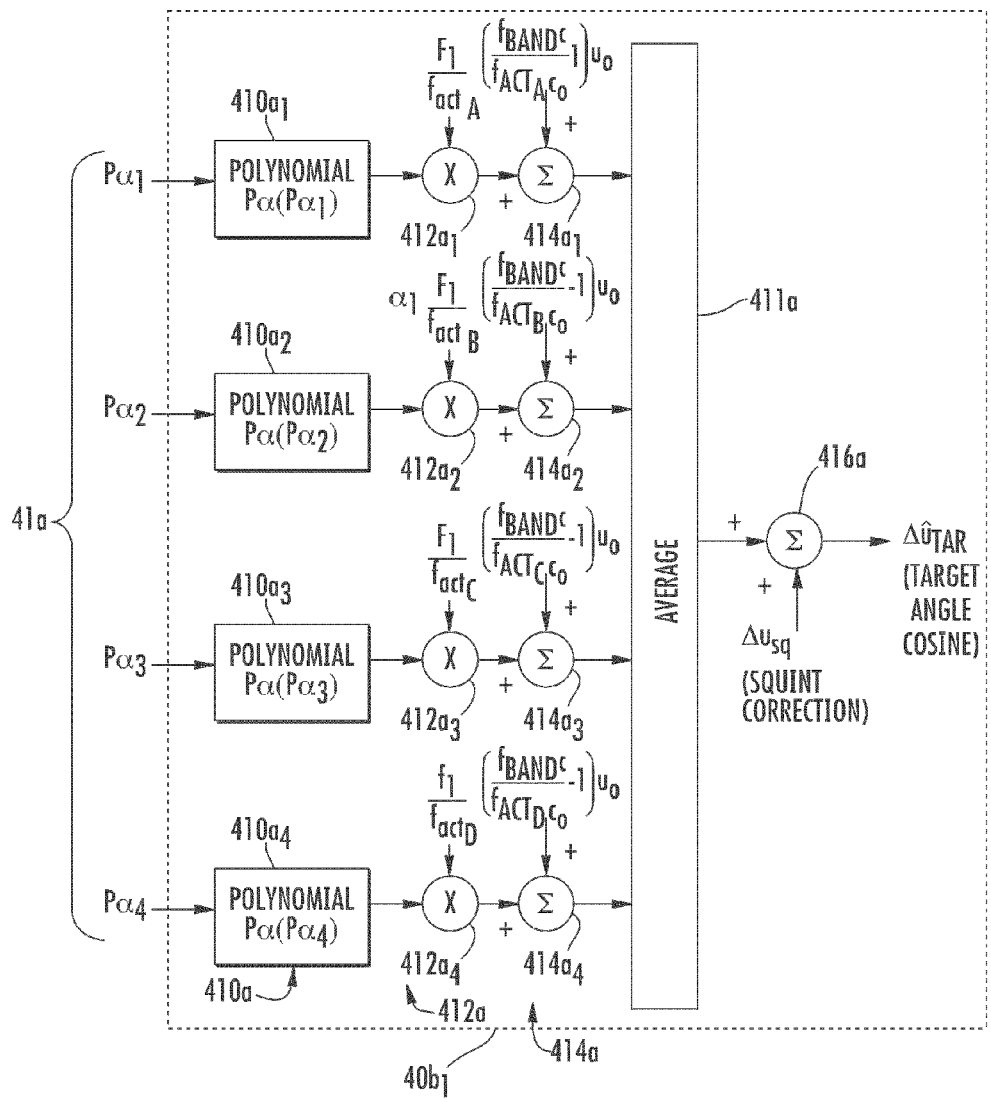
FIGS. 4A and 4B together represent a simplified block diagram illustrating processing of signals of FIG. 3 according to aspects of the disclosure, for determining the angle cosines of the target from the commanded or directed angle cosine of the antenna of FIG. 1.

Thus, there are a total of eight real values of the rhos. Four of them:

$$\rho_{\alpha_1}, \rho_{\alpha_2}, \rho_{\alpha_3}, \rho_{\alpha_4}$$

relate to the direction angle $\alpha$ (the traverse angle) and the other four:

$$\rho_{\beta_1}, \rho_{\beta_2}, \rho_{\beta_3}, \rho_{\beta_4}$$

relate to the direction angle $\beta$ (the co-elevation angle). The rho signals are coupled by way of a path 41 to portion 40 of the monopulse processing. More particularly, the $\rho_{\alpha_1}$, $\rho_{\alpha_2}$, $\rho_{\alpha_3}$, $\rho_{\alpha_4}$ outputs are coupled by way of a path 41a to portion 40b1 of processing 40, and the $\rho_{\beta_1}$, $\rho_{\beta_2}$, $\rho_{\beta_3}$, $\rho_{\beta_4}$ outputs of rho blocks 314b are coupled by way of a path 41b to portion 40b2 of processing 40. FIG. 4A illustrates an alpha portion of monopulse processing block 40, and FIG. 4B illustrates a beta portion of monopulse processing block 40.

Figure 4B:
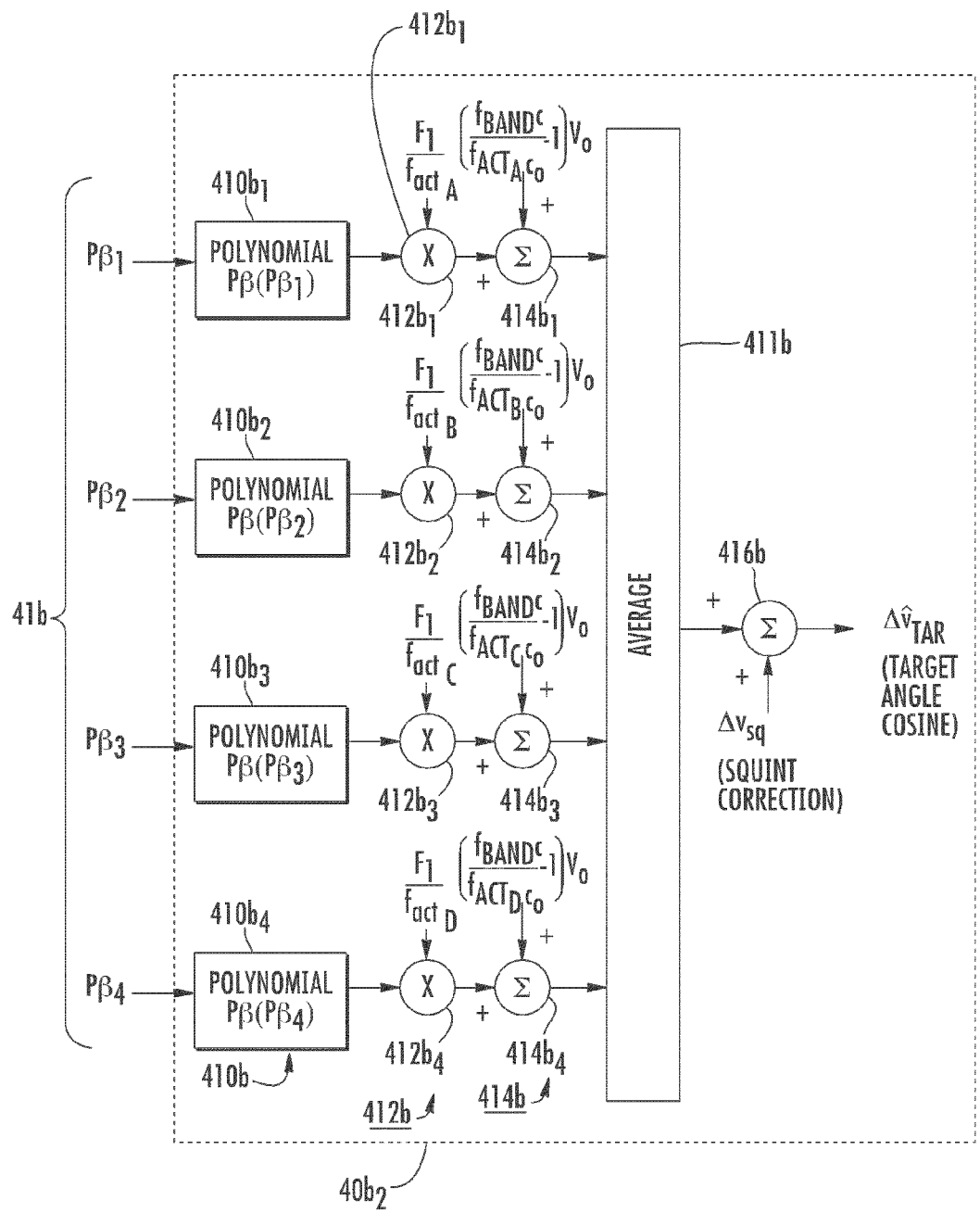

FIGS. 4A and 4B together illustrate details of correction processor 40b of FIG. 2. FIG. 4A relates to details of α processing 40b1, and FIG. 4B relates to details of β processing 40b2. FIGS. 4A and 4B together illustrate processing in accordance with aspects of the disclosure of the rhos produced in the arrangement of FIG. 3. As mentioned, each ρ is the real component of one of eight complex monopulse ratios, four of which represent the Δα angle and the other four of which represent the Δβ angle. FIG. 4A illustrates a set 410a of polynomial blocks, and FIG. 4B illustrates a set 410b of polynomial blocks. In general, each polynomial block of sets 410a and 410b of polynomial blocks produces a cosine of an angle offset from the commanded beam pointing angle cosine, and the outputs of the polynomial blocks provide the cosine differences $$\cos(\alpha_0 + \delta_\alpha) - \cos\alpha_0$$

$$\cos(\beta_0 + \delta\beta) - \cos\beta_0$$

Each of these cosine differences defines an uncorrected direction of the target (along target line 16) relative to the beam direction (along line 13).

The arrangements of FIGS. 4A and 4B implement two types of corrections. FIG. 4A implements the correction cosines to the alpha angle cosine and FIG. 4B implements the correction cosine to the beta angle cosine. The corrections in either case are applied to the corresponding polynomials, the $P_\alpha$'s and the $P_\beta$'s, where each rho is the real component of one of the eight complex monopulse ratios. The correction multiplications and additions are the same for both angles, but the actual values differ based on the direction of the target relative to the beam direction. The correction operation for the cosine of the alpha angle is shown in FIG. 4A and the correction operation for the cosine of the β angle is shown in FIG. 4B. The description of the operations is the same for FIG. 4A and FIG. 4B. The only difference between the two corrections is the set of monopulse polynomials to which the corrections are applied. For the α direction the set of monopulse polynomials are $$P_\alpha(\rho_{\alpha 1}), P_\alpha(\rho_{\alpha 2}), P_\alpha(\rho_{\alpha 3}), P_\alpha(\rho_{\alpha 4}),$$

and for the β direction the set of monopulse polynomials are $$P_\beta(\rho_{\beta 1}), P_\beta(\rho_{\beta 3}), P_\beta(\rho_{\beta 4}).$$

As illustrated in FIG. 4A, the alpha rhos are applied by paths 41a to polynomial blocks of a set 410a of polynomial blocks. More particularly, $\rho_{\alpha 1}$ is applied to a polynomial block $410a_1$ for generating the output $P_\alpha(\rho_{\alpha 1})$, $\rho_{\alpha 2}$ is applied to a polynomial block $410a_2$ for generating the output $P_\alpha(\rho_{\alpha2})$, $\rho_{\alpha3}$ is applied to a polynomial block $410a_3$ for generating the output $P_\alpha(\rho_{\alpha3})$, and $\rho_{\alpha4}$ is applied to a polynomial block $410a_4$ for generating the output $P_\alpha(\rho_{\alpha4})$. As illustrated in FIG. 4B, the beta rhos are applied by way of paths $41b$ to polynomial blocks of a set $410b$ of polynomial blocks. More particularly, $\rho_{\beta1}$ is applied to a polynomial block $410b_1$ for generating the output $P_\beta(\rho_{\beta1})$, $\rho_{\beta2}$ is applied to a polynomial block $410b_2$ for generating the output $P_\beta(\rho_{\beta2})$, $\rho_{\beta3}$ is applied to a polynomial block $410b_3$ for generating the output $P_\beta(\rho_{\beta3})$, and $\rho_{\beta4}$ is applied to a polynomial block $410a_4$ for generating the output $P_\beta(\rho_{\beta4})$.

Figure 1A:
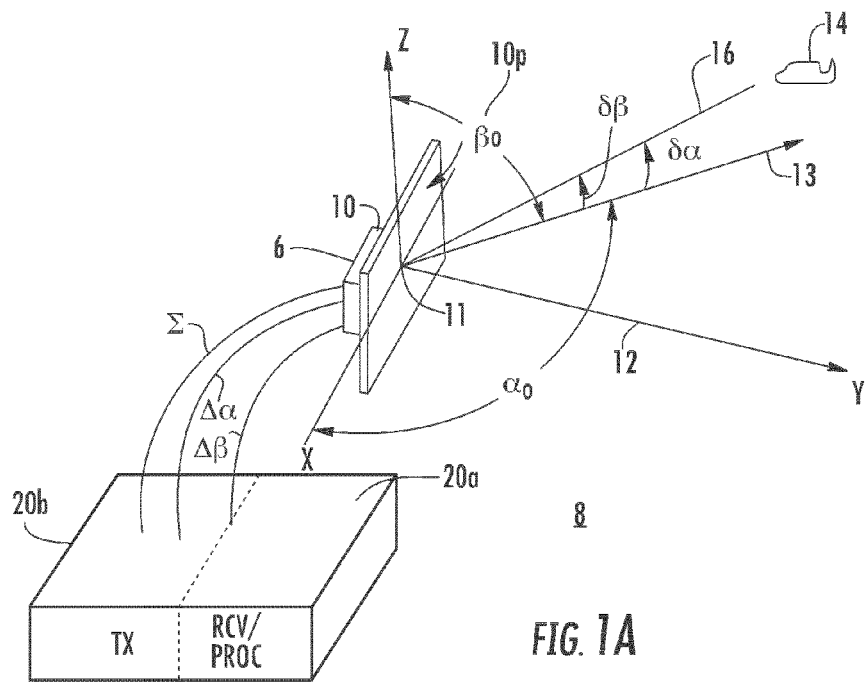
FIG. 1A is a simplified block diagram of a monopulse antenna and radar system including a transmitter and signal processor.
Figure 1B:
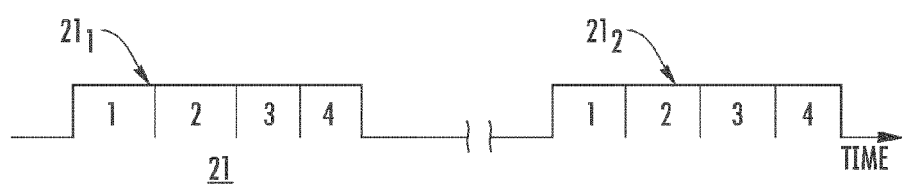
FIG. 1B is a simplified amplitude/time plot of a transmitted waveform.
Figure 1C:
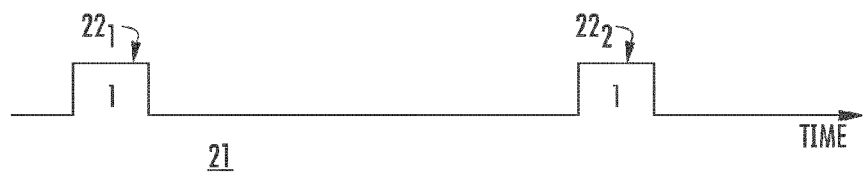
FIG. 1C is a simplified amplitude/time plot of the received waveform in the radar passive mode.

According to an aspect of the disclosure, additive and multiplicative corrections are made to the monopulse angle cosines ($\Delta u$, $\Delta v$) in correction blocks $40b1$ and $40b2$ of FIGS. 4A and 4B, respectively, to improve the accuracy of the monopulse angles by correcting for the effects of frequency deviation and for the actual speed of light. The monopulse angle cosines for each subpulse (deviation angles $\delta\alpha$ and $\delta\beta$ of FIG. 1A) are averaged together in averaging blocks $411a$ and $411b$ after application of corrections. Ordinary prior-art squint corrections are made to the averaged corrected monopulse angle cosines in summing blocks $416a$ and $416b$.

The multiplicative corrections are made by sets $412a$ and $412b$ of multipliers in FIGS. 4A and 4B, respectively. Each multiplier of sets $412a$ and $412b$ of multipliers receives a correction input at one of its input ports, because the polynomials which are used in the polynomial blocks are predicated on operation at one nominal frequency, but are used at frequencies which differ from the nominal. The multiplicative correction inputs correct for the effects of frequency in the polynomial blocks. The multiplicative correction inputs are of the form $$\frac{F_1}{f_{act}},$$

where $F_1$ is the frequency at which the polynomial is determined, and $f_{act}$ is the actual average frequency of the particular subpulse. The value of $f_{act}$ may differ from the nominal frequency of a subpulse if the modulation causes an average frequency shift.

The sum or additive correction is applied to each summing circuit of a set $414$ of summing circuits of FIGS. 4A and 4B for each subpulse. The additive corrections are of the form $$\left(\frac{f_{BAND}c}{f_{act}c_0} - 1\right)u \text{ or } \left(\frac{f_{BAND}c}{f_{act}c_0} - 1\right)v.$$

The additive corrections are off-broadside, off-frequency corrections. The sequential subpulses are transmitted in directions established by the beam steering control (BSC) signals. Each subpulse of a sequence will be directed in a slightly different direction than the previous and subsequent subpulse. Consequently, the apparent location of the target moves with time (or correspondingly frequency) if not corrected. The additive correction compensates for this deviation. The additive correction includes compensation for the change in frequency imposed upon the subpulses and also for the velocity of light. The speed of light which is used is that for transmission through the atmosphere rather than assuming vacuum speed of light. This allows a radar to correct for the actual light speed regardless of its elevation.

As mentioned, additive and multiplicative corrections are made to the monopulse angle cosines according to an aspect of the disclosure to improve the accuracy of the monopulse angles. The monopulse angles cosines for each subpulse (deviation angles) are averaged together after application of corrections. More particularly, alpha corrections $40b_1$ of FIG. 4A are applied to the polynomial outputs $$P_\alpha(\rho_{\alpha1}), P_\alpha(\rho_{\alpha2}), P_\alpha(\rho_{\alpha3}), P_\alpha(\rho_{\alpha4})$$

as illustrated in FIG. 4A, and beta corrections $40b2$ are applied to the polynomial outputs $$P_\beta(\rho_{\beta1}), P_\beta(\rho_{\beta2}), P_\beta(\rho_{\beta3}), P_\beta(\rho_{\beta4})$$

as illustrated in FIG. 4B. The polynomials $P_\alpha$ and $P_\beta$ are odd functions of their arguments:

$$P_\alpha(\rho) = -P_\alpha(-\rho)$$

and $$P_\beta(\rho) = -P_\beta(-\rho)$$

As shown in FIGS. 4A and 4B, the alpha corrections $40b1$ and the beta corrections $40b2$ include both multiplicative (X) and additive ($\Sigma$) corrections. More particularly, the $P_\alpha(\rho_{\alpha1})$ output of polynomial block $410a1$ of FIG. 4A is applied to a multiplier $412a_1$ of a set $412a$ of multipliers, for multiplication by $$\frac{F_1}{f_{ACT_A}},$$

the $P_\alpha(\rho_{\alpha2})$ output of polynomial block $410a_2$ of FIG. 4A is applied to a multiplier $412a_2$ of set $412a$ of multipliers, for multiplication by $$\frac{F_1}{f_{ACT_B}},$$

the $P_\alpha(\rho_{\alpha3})$ output of polynomial block $410a_3$ of FIG. 4A is applied to a multiplier $412a_3$ of set $412a$ of multipliers, for multiplication by $$\frac{F_1}{f_{ACT_C}},$$

and the $P_\alpha(\rho_{\alpha4})$ output of polynomial block $410a_4$ of FIG. 4A is applied to a multiplier $412a_4$ of set $412a$ of multipliers, for multiplication by $$\frac{F_1}{f_{ACT_D}}.$$

Similarly, the $P_\beta(\rho_{\beta1})$ output of polynomial block $410b_1$ of FIG. 4B is applied to a multiplier $412b_1$ of a set $412b$ of multipliers, for multiplication by $$\frac{F_1}{f_{ACT_A}},$$

the $P_\beta(\rho_{\beta2})$ output of polynomial block $410b_2$ of FIG. 4B is applied to a multiplier $412b_2$ of set $412b$ of multipliers, for multiplication by, $$\frac{F_1}{f_{ACT_B}},$$

the $P_\beta(\rho_{\beta3})$ output of polynomial block $410b_3$ of FIG. 4B is applied to a multiplier $412b_3$ of set $412b$ of multipliers, for multiplication by, $$\frac{F_1}{f_{ACT_C}}$$

and the $P_\beta(\rho_{\beta4})$ output of polynomial block $410b_4$ of FIG. 4B is applied to a multiplier $412b_4$ of set $412b$ of multipliers, for multiplication by $$\frac{F_1}{f_{ACT_D}}.$$

Following the multiplicative corrections in sets $412a$ and $412b$ of multipliers, the multiplied outputs of the sets $412a$ and $412b$ of multipliers are applied to corresponding sets $414a$ and $414b$ of adding or summing ($\Sigma$) circuits.

The multiplied output of multiplier $412a_1$ of FIG. 4A is applied to a first input port of a summing circuit $414a_1$, which receives at its second input port the quantity $$\left(\frac{f_{Band}c}{f_{actA}c_0} - 1\right)u_0$$

to thereby produce a summed output, which represents corrections to the value of the polynomial for a first subpulse and for the frequency of the first subpulse, the multiplied output of multiplier $412a_2$ is applied to a first input port of a summing circuit $414a_2$, which receives at its second input port the quantity $$\left(\frac{f_{BAND}c}{f_{actB}c_0} - 1\right)u_0$$

to thereby produce a summed output, which represents corrections to the value of the polynomial for a second subpulse and for the frequency of the second subpulse, the multiplied output of multiplier $412a_3$ is applied to a first input port of a summing circuit $414a_3$, which receives at its second input port the quantity $$\left(\frac{f_{BAND}c}{f_{actC}c_0} - 1\right)u_0$$

to thereby produce a summed output, which represents corrections to the value of the polynomial for a third subpulse and for the frequency of the third subpulse, and the multiplied output of multiplier $412a_4$ is applied to a first input port of a summing circuit $414a_4$, which receives at its second input port the quantity $$\left(\frac{f_{BAND}c}{f_{actD}c_0} - 1\right)u_0$$

to thereby produce a summed output, which represents corrections to the value of the polynomial for a fourth subpulse and for the frequency of the fourth subpulse, which represents corrections to the value of the polynomial for a fourth subpulse. Also, the multiplied output of multiplier $412b_1$ of FIG. 4B is applied to a first input port of a summing circuit $414b_1$, which receives at its second input port the quantity $$\left(\frac{f_{BAND}c}{f_{actA}c_0} - 1\right)v_0$$

to thereby produce a summed output, which represents corrections to the value of the polynomial for a first subpulse and for the frequency of the first subpulse, the multiplied output of multiplier $412b_2$ is applied to a first input port of a summing circuit $414b_2$, which receives at its second input port the quantity $$\left(\frac{f_{BAND}c}{f_{actB}c_0} - 1\right)v_0$$

to thereby produce a summed output, which represents corrections to the value of the polynomial for a second subpulse and for the frequency of the second subpulse, the multiplied output of multiplier $412b_3$ is applied to a first input port of a summing circuit $414b_3$, which receives at its second input port the quantity $$\left(\frac{f_{BAND}c}{f_{actC}c_0} - 1\right)v_0$$

to thereby produce a summed output, which represents corrections to the value of the polynomial for a third subpulse and for the frequency of the third subpulse, and the multiplied output of multiplier $412b_4$ is applied to a first input port of a summing circuit $414b_4$, which receives at its second input port the quantity $$\left(\frac{f_{BAND}c}{f_{actD}c_0} - 1\right)v_0$$

to thereby produce a summed output, which represents corrections to the value of the polynomial for a fourth subpulse and for the frequency of the fourth subpulse.

The summed outputs from the summing circuits of sets $414a$ and $414b$ of summing circuits of FIGS. 4A and 4B are applied to averaging circuits illustrated as $411a$ and $411b$ of FIGS. 4A and 4B, respectively. Averaging circuits $411a$ and $411b$ each generate or form a mean or average value of the applied summed outputs. The averaged corrections are then summed with well-known antenna squint corrections in summing blocks $416a$ and $416b$. The squint-corrected target angle cosine delta is the corrected target angle cosine offset from commanded beam pointing direction. The target tracker $95$ of FIG. 2 receives the corrected target angle cosine offset information from correction processor $40b$ and sums the correction with the beam pointing direction to establish the estimated target direction.

According to an aspect of the disclosure, the monopulse processing solves for $\cos\alpha_{target}$ which is the cosine of the alpha angle of the target $14$ measured from the array X axis using the equation $$\cos\alpha_{target} = \cos\alpha_{des} + \frac{1}{n_{sp}}\sum_{i=1}^{n_{sp}}\left[\frac{F_1 P_\alpha(\rho_{\alpha i})}{f_{acti}} + \left(\frac{cf_{BAND}}{c_0 f_{acti}} - 1\right)\cos\alpha_{des}\right] + \Delta u_{sq} \quad (1)$$

where:
$\cos\alpha_{des}$=designated $\cos\alpha$ from the beam steering controller (BSC) indicated in FIG. 2;

$n_{sp}$=number of subpulses;
$F_1$=nominal frequency for which the polynomials are obtained;
$f_{BAND}$=the nominal frequency of the frequency band in use;
$f_{acti}$=actual frequency of the i-th subpulse=$f_{Band}$+subpulse average frequency;
$f_{actA}$, $f_{actB}$, $f_{actC}$, $f_{actD}$,=actual average frequencies of subpulses A, B, C, D; the value of $f_{act}$ may differ from the nominal frequency of a subpulse if the modulation causes an average frequency shift;
$\rho_{\alpha i}$=real part of i-th monopulse ratio for subpulse i;
$P_\alpha(\rho)$=alpha polynomial for the $\alpha$ angle derived for frequency $F_1$, and evaluated at real part $\rho$ of the monopulse ratio;
c=light speed at the antenna;
$c_0$=vacuum light speed;
$\Delta u_{sq}$=squint correction for cos $\alpha$, and obtained in an antenna calibration facility.

In a particular application, $n_{sp}$=4, but in another application, $n_{sp}$ may be a different number.

In a particular application $P_\alpha(\rho)$ is an odd polynomial of degree 7 evaluated at argument $\rho$, but polynomials of different degree may be used. Thus, in the embodiment with 4 subpulses, the polynomial $P_\alpha$ would have four values:
$P_\alpha(\rho_{\alpha 1})$, $P_\alpha(\rho_{\alpha 2})$, $P_\alpha(\rho_{\alpha 3})$, $P_\alpha(\rho_{\alpha 4})$ and
$f_{BAND}$=the nominal frequency used for transmission for a particular set of transmitted pulses; in a particular application, $f_{BAND}$ may have plural or many values.

The monopulse processing also solves for cos $\beta_{target}$ which is the cosine of the beta angle of the target 14 measured from the array Y axis using the equation $$\cos\beta_{target} = \cos\beta_{des} + \frac{1}{n_{sp}}\sum_{i=1}^{n_{sp}}\left[\frac{F_1 P_\beta(\rho_{\beta i})}{f_{acti}} + \left(\frac{c f_{BAND}}{c_0 f_{acti}} - 1\right)\cos\beta_{des}\right] + \Delta v_{sq} \quad (2)$$

where:
cos $\beta_{des}$=designated cos $\beta$ from the beam steering controller (BSC) indicated in FIG. 2;
$n_{sp}$=number of subpulses;
$f_{BAND}$=the nominal frequency of the frequency band in use;
$f_{acti}$=actual frequency of the i-th subpulse=$f_{BAND}$+subpulse average frequency;
$\rho_{\beta i}$=real part of i-th monopulse ratio for subpulse i;
$P_\beta(\rho)$=beta polynomial for the $\beta$ angle derived for frequency $F_1$, and evaluated at real part $\rho$ of the monopulse ratio;
c=light speed at the antenna;
$c_0$=vacuum light speed;
$\Delta v_{sq}$=squint correction for cos $\beta$, and obtained in an antenna calibration facility.

Angular squint arises from imperfections in manufacture of antenna radiating elements and in their locations in an antenna array.

The resulting angle cosines are applied to a conventional target tracker, as known in the art.

While the description and analysis of the geometry associated with the radar and target is couched in terms of direction cosines, those skilled in the art understand that the description could instead be in terms of angles. Those skilled in the art using analysis based on angles will generate equations which may be different in form from those set forth herein, but which may be totally equivalent in principle.

A radar system (8) according to an aspect of the disclosure includes an antenna (10) and an antenna beam direction controller (90), and also includes a transmitter (20b) for transmitting subpulses at nominal frequencies F but with modulation which may result in an actual average frequency different from frequencies F. A receiver (20a; 40a) receives monopulse signals from a target (14), and generates rho ($\rho$) signals, each of which rho ($\rho$) signals is the real component of one of eight complex monopulse ratios, four of which represent the $\Delta\alpha$ angle and the other four of which represent the $\Delta\beta$ angle. A polynomial processor (410a, 410b) is coupled to the receiver (20a; 40a), for producing uncorrected cosine differences of angular offsets of the target (14) from the commanded beam pointing direction (13)

$\cos(\alpha_0+\delta\alpha)-\cos\alpha_0$ $\cos(\beta_0+\delta\beta)-\cos\beta_0$;

The radar system (8) also includes a multiplicative correction processor (412a, 412b) for multiplying the uncorrected cosine differences by a factor including (a) the frequency (F) at which the polynomial is determined and (b) the actual average frequency ($f_{act}$) of the particular subpulse, to thereby generate multiplied cosine differences for each subpulse. A summing correction processor (414a, 414b) is coupled to the multiplicative correction processor (412a, 412b) for adding to the multiplied cosine differences a correction term for compensating for apparent movement of the target arising in a particular direction from beam movement at each subpulse, to thereby generate a plurality of multiplicatively and additively compensated angles or angle cosine difference signals representing the direction of the target (14). An averaging arrangement is coupled to the summing correction processor for averaging the angles or angle cosine difference signals over all subpulses of a pulse to thereby produce averaged corrected angular difference signals representative of the location of the target. In a particular embodiment of this aspect of the disclosure, the summing correction processor further adds to the multiplied cosine differences a correction term for compensating for the actual speed of light in the environment of the radar. The correction term for compensating for apparent movement is in the form of one of $$\left(\frac{f_{BAND}c}{f_{act}c_0} - 1\right)u \text{ and } \left(\frac{f_{BAND}c}{f_{act}c_0} - 1\right)v.$$

In a version of this embodiment, a squint corrector is coupled to the averaging arrangement, for summing a squint correction with the averaged angular difference signals to generate target angular information representative of corrected direction of the target.

A radar system (8) according to another aspect of the disclosure includes a transmitter (20b), a waveform generator (91) coupled to the transmitter (20b) for driving the transmitter with sets ($21_1$, $21_2$, ...) of sequential pulses (1, 2, 3, & 4). Each pulse of each of the sets ($21_1$, $21_2$, is jump-frequency modulated relative to other pulses of the set, to thereby define a plurality of subpulses (1, 2, 3, & 4) for each of the sets ($21_1$, $21_2$, ...) of sequential pulses. The radar system (8) comprises an antenna (10) coupled to the transmitter (20b), for transmitting electromagnetic signals in response to the sets ($21_1$, $21_2$, ...) of sequential subpulses (1, 2, 3, & 4), and for, in the presence of a target (14), generating separate return signals for each of the sequential subpulses of each set. A receiver (22, 32) receives the return signals and generates received signals (on set 28 of paths). The received signals include a separate digital signal subpulse for each of the separate return signals. A splitting arrangement (6) is coupled to the antenna

(10) for splitting the received signals into co-elevation and traverse difference ($\Delta\beta$, $\Delta\alpha$) components and a sum ($\Sigma$) component. A prior-art monopulse ratio processor (40a) is coupled to the splitting arrangement (6) for combining the co-elevation and traverse difference ($\Delta\beta$, $\Delta\alpha$) components and the sum ($\Sigma$) component signal to provide a monopulse ratio ($\rho_\alpha$ & $\rho_\beta$). A monopulse correction processor (40b) is coupled to the monopulse ratio processor (40a) for correcting the direction of the target (14) with corrections based on at least one subpulse frequency and one of active and passive operating modes.

A radar system (8) according to an aspect of the disclosure includes a transmitter (20b) and a waveform generator (52) coupled to the transmitter (20b) for driving the transmitter (20b) with sets (21) of sequential pulses (1, 2, 3, . . . ). Each pulse of each of the sets is jump-frequency modulated relative to other pulses of the set. The radar system (8) comprises an antenna (10) coupled to the transmitter (20b), for transmitting electromagnetic signals in response to the sets of sequential pulses, and a receiver (20a) for, in the presence of a target (14), generating separate return signals for each of the sequential pulses (1, 2, 3, . . . ) of each set (21). The receiver receives the return signals and generates received signals, which include a separate digital signal for each of the separate return signals. A splitting arrangement (6) is coupled to the receiver (20a) for splitting the received signals into vertical and horizontal difference components ($\Delta\beta$, $\Delta\alpha_j$) and a sum component ($\Sigma$). A monopulse processor (312) is coupled to the splitting arrangement (6) for combining the vertical and horizontal difference components ($\Delta\beta$, $\Delta\alpha_j$) and a sum component ($\Sigma$) signal to provide a monopulse ratio ($\rho_\alpha$ and $\rho_\beta$). A monopulse ratio processor (40b1, 40b2) is coupled to the monopulse processor (312) for generating corrected direction of the target $\cos\alpha_{target}$ by $$\cos\alpha_{target} = \qquad(1)$$

$$\cos\alpha_{des} + \frac{1}{n_{sp}}\sum_{i=1}^{n_{sp}}\left[\frac{F_1 P_\alpha(\rho_{\alpha i})}{f_{acti}} + \left(\frac{cf_{BAND}}{c_0 f_{acti}} - 1\right)\cos\alpha_{des}\right] + \Delta u_{sq}$$

where:
$\cos\alpha_{des}$=designated $\cos\alpha$ from the beam steering controller (BSC);
$n_{sp}$=number of subpulses;
$F_1$=nominal frequency for which the a polynomial $P_\alpha(\rho)$ was obtained;
$f_{BAND}$=the nominal frequency of the frequency band in use;
$f_{acti}$=actual frequency of the i-th subpulse=$f_{BAND}$=subpulse average frequency;
$\rho_{\alpha i}$=real part of i-th monopulse ratio for subpulse i;
$P_\alpha(\rho)$=alpha polynomial for the $\alpha$ angle derived for frequency $F_1$, and evaluated at real part $\rho$ of the monopulse ratio;
c=light speed at the antenna;
$c_0$=vacuum light speed;
$\Delta u_{sq}$=squint correction for $\cos\alpha$, as shown in FIG. 4A, and obtained in an antenna calibration facility,
and for generating corrected direction of target $\cos\beta_{target}$ by $$\cos\beta_{target} = \qquad(2)$$

$$\cos\beta_{des} + \frac{1}{n_{sp}}\sum_{i=1}^{n_{sp}}\left[\frac{F_1 P_\beta(\rho_{\beta i})}{f_{acti}} + \left(\frac{cf_{BAND}}{c_0 f_{acti}} - 1\right)\cos\beta_{des}\right] + \Delta v_{sq}$$

where:
$\cos\beta_{des}$=designated $\cos\beta$ from the beam steering controller (BSC) indicated in FIG. 2;

$n_{sp}$=number of subpulses;
$F_1$=nominal frequency for which the $\beta$ polynomial $P_\beta(\rho)$ was obtained;
$f_{BAND}$=the nominal frequency of the frequency band in use;
$f_{acti}$=actual frequency of the i-th subpulse=$f_{BAND}$+subpulse average frequency;
$\rho_{\beta i}$=real part of i-th monopulse ratio for subpulse i;
$P_\beta(\rho)$=beta polynomial for the $\beta$ angle derived for frequency $F_1$, and evaluated at real part $\rho$ of the monopulse ratio;
c=light speed at the antenna;
$c_0$=vacuum light speed;
$\Delta v_{sq}$=squint correction for $\cos\beta$, and obtained in an antenna calibration facility.

What is claimed is:

1. A radar system, comprising:
a beam direction controller:
a transmitter for transmitting subpulses at nominal frequencies F with modulation which is capable of resulting in an actual average frequency different from frequencies F;
a monopulse receiver for receiving signals from a target, and for generating rho ($\rho$) signals, each of which rho signals is a real component of one of eight complex monopulse ratios, four of which represent a $\Delta\alpha$ angle and the other four of which represent a $\Delta\beta$ angle;
a polynomial processor coupled to said receiver, for producing uncorrected cosine differences of angular offsets of a target from a commanded beam pointing direction or angle cosines $\cos(\alpha_0 + \delta\alpha) - \cos\alpha_0$ $\cos(\beta_0 + \delta\beta) - \cos\beta_0$;

a multiplicative correction processor for multiplying said uncorrected cosine differences by a factor including (a) a frequency at which a polynomial is determined and (b) an actual average frequency of a particular subpulse, to thereby generate multiplied cosine differences for each subpulse;
a summing correction processor coupled to said multiplicative correction processor for adding to said multiplied cosine differences a correction term for compensating for apparent movement of the target arising in a particular direction from beam movement at each subpulse, to thereby generate a plurality of multiplicatively and additively compensated angles or angle cosine difference signals; and
an averaging arrangement coupled to said summing correction processor for averaging said angles or angle cosine difference signals over all subpulses of a pulse to thereby produce averaged angular difference signals representative of a location of the target,
wherein
$\rho$=a real component of one of eight complex monopulse ratios;
$\Delta\alpha$=difference of half-antenna outputs corresponding to an $\alpha$ direction;
$\Delta\beta$=difference of half-antenna outputs corresponding to a $\beta$ direction;
$\alpha_0$=direction angle measured from a positive X axis to a beam direction line;
$\beta_0$=direction anile measured from a positive Z axis to the beam direction line;
$\delta\alpha$=departure angle from beam direction angle $\alpha_0$; and
$\delta\beta$=departure angle from beam direction angle $\beta_0$.

2. A radar according to claim 1, wherein said summing correction processor coupled to said multiplicative correction processor further adds to said multiplied cosine differences a correction term for compensating for actual speed of light in an environment of said radar.

3. A radar according to claim 2, wherein said correction term for compensating for apparent movement is in the form of one of $$\left(\frac{f_{BAND}c}{f_{act}c_0} - 1\right)u$$

and $$\left(\frac{f_{BAND}c}{f_{act}c_0} - 1\right)v,$$

wherein
c=light speed at an antenna;
$c_0$=vacuum light speed;
u=direction cosine for an α direction;
v=direction cosine for a β direction;
$f_{BAND}$=nominal frequency of a frequency band in use and
$f_{act}$=actual frequency of a particular subpulse.

4. A radar according to claim 1, further comprising a squint corrector coupled to said averaging arrangement, for summing a squint correction with said averaged angular difference signals to generate target angular information representative of a corrected direction of the target.

5. A radar system including a transmitter, a waveform generator coupled to said transmitter for driving said transmitter with sets of sequential pulses, each pulse of each of said sets being jump-frequency modulated relative to other pulses of the set to thereby define a plurality of subpulses for each said set of sequential pulses, said radar system comprising:
an antenna coupled to said transmitter, for transmitting electromagnetic signals in response to said sets of sequential subpulses, and for, in the presence of a target, generating separate return signals for each of said sequential subpulses of each set;
a receiver for receiving said return signals and for generating received signals, said received signals including a separate digital signal subpulse for each of said separate return signals;
a splitting arrangement for splitting said received signals into co-elevation and traverse difference component;
a monopulse processor for combining said co-elevation and traverse difference components and said sum component signal to provide monopulse ratios representing an uncorrected direction to the target; and
a monopulse correction processor for correcting the uncorrected direction to the target with corrections based on each subpulse frequency.

6. A radar system including a transmitter, a waveform generator coupled to said transmitter for driving said transmitter with sets of sequential pulses, each pulse of each of said sets being jump-frequency modulated relative to other pulses of the set, said radar system comprising:
an antenna coupled to said transmitter, for transmitting electromagnetic signals in response to said sets of sequential pulses, and for, in the presence of a target, generating separate return signals for each of said sequential pulses of each set;
a receiver for receiving said return signals and for generating received signals, said received signals including a separate digital signal for each of said separate return signals;
a splitting arrangement coupled to said receiver for splitting said received signals into vertical and horizontal difference components and a sum component;
a monopulse processor coupled to said splitting arrangement for combining said vertical and horizontal difference components and said sum component to provide a monopulse ratio; and
a monopulse ratio processor coupled to said monopulse processor for generating corrected direction of the target cos $\alpha_{target}$ by solving $$\cos\alpha_{target} = \cos\alpha_{des} + \frac{1}{n_{sp}}\sum_{i=1}^{n_{sp}}\left[\frac{F_1 P_\alpha(\rho_{\alpha i})}{f_{acti}} + \left(\frac{cf_{BAND}}{c_0 f_{acti}} - 1\right)\cos\alpha_{des}\right] + \Delta u_{sq}$$

and for generating corrected direction of target cos $\beta_{target}$ by solving $$\cos\beta_{target} = \cos\beta_{des} + \frac{1}{n_{sp}}\sum_{i=1}^{n_{sp}}\left[\frac{F_1 P_\beta(\rho_{\beta i})}{f_{acti}} + \left(\frac{cf_{BAND}}{c_0 f_{acti}} - 1\right)\cos\beta_{des}\right] + \Delta v_{sq}$$

where
cos $\alpha_{des}$=designated cos α from a beam steering controller;
cos $\beta_{des}$=designated cos β from the beam steering controller;
$n_{sp}$=number of subpulses;
$F_1$=nominal frequency for which an alpha polynomial $P_\alpha(\rho)$ or a beta polynomial $P_\beta(\rho)$ were obtained;
$f_{BAND}$=the nominal frequency of the frequency band in use;
$f_{acti}$=actual frequency of an i-th subpulse=$f_{BAND}$+subpulse average frequency;
$\rho_{\beta i}$=real part of i-th monopulse ratio for subpulse i;
$P_\alpha(\rho)$=alpha polynomial for an α angle derived for frequency $F_1$, and evaluated at real part ρ of the monopulse ratio;
$P_\beta(\rho)$=beta polynomial for a β angle derived for frequency $F_1$, and evaluated at real part ρ of the monopulse ratio;
c=light speed at the antenna;
$c_0$=vacuum light speed; and
$\Delta u_{sq}$, $\Delta v_{sq}$=squint corrections for cos α and cos β, respectively, obtained from an antenna calibration;
$\alpha_{target}$=alpha anile of the tar et measured from an array X axis;
$\beta_{tareget}$=beta anile of the tar et measured from the array Y axis;
$\alpha_{des}$=alpha angle of the target measured from a beam steering controller;
$\beta_{des}$=beta angle of the target measured from the beam steering controller;
$\rho_{\alpha i}$=real art of i-th monopulse ratio for subpulse i;
α=traverse direction angle; and
β=co-elevation direction angle.

7. A receiver for, in the presence of a target, generating separate received signals for each sequential subpulse of a set of subpulses, said separate received signals including a separate digital signal subpulse for each of a plurality of separate return signals returned from a target, said receiver comprising:
a splitting arrangement for splitting said received signals into co-elevation and traverse difference components;
a monopulse processor for combining said co-elevation and traverse difference components and a sum component signal to provide monopulse ratios representing uncorrected direction to the target; and a monopulse correction processor for correcting the uncorrected direction to the target with corrections based on each subpulse frequency.

8. A receiver for receiving radar return signals and for generating received signals, said received signals including a separate digital signal for each of said separate return signals, said receiver comprising:
   a splitting arrangement coupled to said receiver for splitting said received signals into vertical and horizontal difference components and a sum component;
   a beam steering controller;
   a monopulse processor coupled to said splitting arrangement for combining said vertical and horizontal difference components and said sum component signal to provide a monopulse ratio; and
   a monopulse ratio processor coupled to said monopulse processor for generating corrected direction of the target $\cos \alpha_{target}$ by solving $$\cos\alpha_{target} = \cos\alpha_{des} + \frac{1}{n_{sp}}\sum_{i=1}^{n_{sp}}\left[\frac{F_1 P_\alpha(\rho_{\alpha i})}{f_{acti}} + \left(\frac{cf_{BAND}}{c_0 f_{acti}} - 1\right)\cos\alpha_{des}\right] + \Delta u_{sq}$$

and for generating corrected direction of target $\cos \beta_{target}$ by solving $$\cos\beta_{target} = \cos\beta_{des} + \frac{1}{n_{sp}}\sum_{i=1}^{n_{sp}}\left[\frac{F_1 P_\beta(\rho_{\beta i})}{f_{acti}} + \left(\frac{cf_{BAND}}{c_0 f_{acti}} - 1\right)\cos\beta_{des}\right] + \Delta v_{sq}$$

where
   $\cos \alpha_{des}$=designated $\cos \alpha$ from the beam steering controller;
   $\cos \beta_{des}$=designated $\cos \beta$ from the beam steering controller;
   $n_{sp}$=number of subpulses;
   $F_1$=nominal frequency for which an alpha polynomial $P_\alpha(\rho)$ or a beta polynomial $P_\beta(\rho)$ were obtained;
   $f_{BAND}$=nominal frequency of the frequency band in use;
   $f_{acti}$=actual frequency of an i-th subpulse
   =$f_{BAND}$+subpulse average frequency;
   $\rho_{\beta i}$=real part of i-th monopulse ratio for subpulse i;
   $P_\alpha(\rho)$=alpha polynomial for an $\alpha$ angle derived for frequency $F_1$, and evaluated at real part $\rho$ of the monopulse ratio;
   $P_\beta(\rho)$=beta polynomial for a $\beta$ angle derived for frequency $F_1$, and evaluated at real part $\rho$ of the monopulse ratio;
   c=light speed at the antenna;
   $c_0$=vacuum light speed;
   $\Delta u_{sq}$, $\Delta v_{sq}$=squint corrections for $\cos \alpha$ and $\cos \beta$, respectively, obtained from an antenna calibration;
   $\alpha_{target}$=alpha angle of the target measured from an array X axis;
   $\beta_{target}$=beta anile of the tar et measured from the array Y axis;
   $\alpha_{des}$=alpha anile of the tar et measured from a beam steering controller
   $\beta_{des}$=beta angle of the target measured from the beam steering controller;
   $\rho_{\alpha i}$=real part of i-th monopulse ratio for subpulse i;
   $\alpha$=traverse direction angle; and
   $\beta$=co-elevation direction angle.

9. A radar system comprising:
   a transmitter for transmitting subpulses;
   a monopulse receiver for receiving return signals from a target, and for generating rho signals, each of which rho signal is a real component of one of eight complex monopulse ratios, four of which represent a $\Delta\alpha$ angle and the other four of which represent a $\Delta\beta$ angle;
   a polynomial processor coupled to said receiver, for producing uncorrected cosine differences of angular offsets of the target from the commanded beam pointing direction;
   a multiplicative correction processor for multiplying said uncorrected cosine differences to generate multiplied cosine differences for each subpulse;
   a summing correction processor for adding to said multiplied cosine differences a correction term for compensating for apparent movement of the target arising in a particular direction from beam movement at each subpulse, to generate a plurality of multiplicatively and additively compensated angles or angle cosine difference signals; and
   an averaging arrangement for averaging said additively compensated angles or angle cosine difference signals over all subpulses of a pulse to thereby produce averaged angular difference signals representative of a location of the target;
where
   $\Delta\alpha$=difference of half-antenna outputs corresponding to an $\alpha$ direction; and
   $\Delta\beta$=difference of half-antenna outputs corresponding to a $\beta$ direction.

10. A radar system according to claim 9, wherein said summing correction processor adds to said multiplied cosine differences a correction term for compensating for actual speed of light in an environment of said radar.

11. A radar system according to claim 9, wherein said correction term for compensating for apparent movement is in the form of one of:

$$\left(\frac{f_{BAND}c}{f_{act}c_0} - 1\right)u \text{ and } \left(\frac{f_{BAND}c}{f_{act}c_0} - 1\right)v$$

wherein
   c=light speed at the antenna;
   $c_0$=vacuum light speed;
   u=direction cosine for an $\alpha$ direction;
   v=direction cosine for a $\beta$ direction;
   $f_{BAND}$=nominal frequency of a frequency band in use and
   $f_{act}$=actual frequency of a particular subpulse.

12. A radar system according to claim 9, further comprising a squint corrector coupled to said averaging arrangement, for summing a squint correction with said averaged angular difference signals to generate target angular information representative of a corrected direction of the target.

13. A radar system, comprising:
   a beam direction controller:
   a transmitter for transmitting subpulses at nominal frequencies;
   a monopulse receiver for receiving signals from a target, and for generating rho signals, each of which rho signals is a component of one of a plurality of monopulse ratios;
   a polynomial processor coupled to said monopulse receiver, for producing uncorrected cosine differences of angular offsets of a target from a commanded beam pointing direction;

a multiplicative correction processor for multiplying said uncorrected cosine differences by a factor to generate multiplied cosine differences for each subpulse;

a summing correction processor coupled to said multiplicative correction processor for adding to said multiplied cosine differences a correction term for compensating for apparent movement of the target arising in a direction from beam movement at each subpulse, to generate a plurality of multiplicatively and additively compensated angle cosine difference signals; and an averaging arrangement coupled to said summing correction processor for averaging said angle cosine difference signals over all subpulses of a pulse to produce averaged angular difference signals representative of a location of the target.

14. A radar system according to claim 13, wherein said summing correction processor adds to said multiplied cosine differences a correction term for compensating for speed of light in an environment of said radar.

15. A radar system according to claim 14, wherein said correction term for compensating for apparent movement is in the form of one of:

$$\left(\frac{f_{BAND}c}{f_{act}c_0} - 1\right)u \text{ and } \left(\frac{f_{BAND}c}{f_{act}c_0} - 1\right)v$$

wherein
  c=light speed at the antenna;
  $c_0$=vacuum light speed;
  u=direction cosine for an α direction;
  v=direction cosine for a β direction;
  $f_{BAND}$=nominal frequency of a frequency band in use; and
  $f_{act}$=actual frequency of a particular subpulse.

16. A radar system according to claim 13, further comprising a squint corrector coupled to said averaging arrangement, for summing a squint correction with said averaged angular difference signals to generate target angular information representative of a corrected direction of the target.

17. A computer-implemented method for operating a radar system, comprising:

transmitting subpulses at nominal frequencies;

receiving signals from a target, and generating rho signals, where each of said rho signals is a component of one of a plurality of monopulse ratios;

producing uncorrected cosine differences of angular offsets of a target from a commanded beam pointing direction;

using a computer processor for carrying out the step of multiplying said uncorrected cosine differences by a factor to generate multiplied cosine differences for each subpulse;

using a computer processor for carrying out the step of adding to said multiplied cosine differences a correction term for compensating for apparent movement of the target arising in a direction from beam movement at each subpulse, to generate a plurality of multiplicatively and additively compensated angle cosine difference signals; and averaging said angle cosine difference signals over all subpulses of a pulse to produce averaged angular difference signals representative of a location of the target;

using said averaged angular difference signals to determine whether a target location is a newly detected target or is a new position of a previously-identified target; and if the target location is a newly identified target, establishing a new target track to follow the target, or if the target location is a previously-identified target, using the target location to update a track on the previously-identified target.

18. A computer-implemented method according to claim 17, wherein said adding step adds to said multiplied cosine differences a correction term for compensating for speed of light in an environment of said radar.

19. A computer-implemented method according to claim 18, wherein said correction term for compensating for apparent movement is in the form of one of:

$$\left(\frac{f_{BAND}c}{f_{act}c_0} - 1\right)u \text{ and } \left(\frac{f_{BAND}c}{f_{act}c_0} - 1\right)v$$

wherein
  c=light speed at an antenna;
  $c_0$=vacuum light speed;
  u=direction cosine for an α direction;
  v=direction cosine for a β direction;
  $f_{BAND}$=nominal frequency of a frequency band in use and
  $f_{act}$=actual frequency of a particular subpulse.

20. A computer-implemented method according to claim 17, comprising the further step of summing a squint correction with said averaged angular difference signals to generate target angular information representative of a corrected direction of the target.

* * * * *

UNITED STATES PATENT AND TRADEMARK OFFICE
CERTIFICATE OF CORRECTION

| | | |
|---|---|---|
| PATENT NO. | : 8,269,665 B1 | Page 1 of 1 |
| APPLICATION NO. | : 12/696248 | |
| DATED | : September 18, 2012 | |
| INVENTOR(S) | : Harry Urkowitz, Robert A. Postell and Robert E. Lefferts | |

It is certified that error appears in the above-identified patent and that said Letters Patent is hereby corrected as shown below:

Column 18, claim 1, line 62, the second word should be "angle".
Column 20, claim 6, line 47, the second word should be "angle" and the fifth word should be "target".
Column 20, claim 6, line 49, the second word should be "angle" and the fifth word should be "target".
Column 21, claim 8, line 59, the second word should be "angle" and the fifth word should be "target".
Column 21, claim 8, line 61, the second word should be "angle" and the fifth word should be "target".

Signed and Sealed this
Twenty-third Day of October, 2012

David J. Kappos
*Director of the United States Patent and Trademark Office*